(12) United States Patent
Ishizaki et al.

(10) Patent No.: US 6,600,412 B2
(45) Date of Patent: Jul. 29, 2003

(54) SENSOR SYSTEM FOR VEHICLE

(75) Inventors: Tatsuya Ishizaki, Wako (JP); Kaoru Nagatomi, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/953,484

(22) Filed: Sep. 14, 2001

(65) Prior Publication Data
US 2002/0033755 A1 Mar. 21, 2002

(30) Foreign Application Priority Data
Sep. 19, 2000 (JP) .................................. 2000-284289

(51) Int. Cl.$^7$ ................................................ B60Q 1/00
(52) U.S. Cl. ................. 340/436; 340/435; 340/903; 340/438; 340/439; 340/665; 701/301; 180/282; 180/271; 180/274; 180/289; 280/734; 280/735
(58) Field of Search ........................... 340/436, 435, 340/903, 438, 439, 665; 701/301; 180/282, 271, 274, 289; 280/734, 735

(56) References Cited

U.S. PATENT DOCUMENTS

| | | | | |
|---|---|---|---|---|
| 4,249,632 A | * | 2/1981 | Lucchini et al. | 180/274 |
| 4,528,563 A | * | 7/1985 | Takeuchi | 340/903 |
| 5,317,512 A | * | 5/1994 | Ota et al. | 701/46 |
| 5,767,766 A | * | 6/1998 | Kwun | 340/436 |
| 6,182,782 B1 | * | 2/2001 | Matsuura et al. | 180/274 |
| 6,329,910 B1 | * | 12/2001 | Farrington | 340/436 |

FOREIGN PATENT DOCUMENTS

| | | | |
|---|---|---|---|
| DE | 197 18 803 C1 | 10/1998 | |
| EP | 0 914 992 A1 | 12/1999 | |
| JP | 08216826 | 8/1996 | ........... B60R/21/31 |

* cited by examiner

Primary Examiner—Daniel J. Wu
Assistant Examiner—Tai T. Nguyen
(74) Attorney, Agent, or Firm—Merchant & Gould, P.C.

(57) ABSTRACT

A vehicular sensor system of the present invention includes a plurality of bumper sensors mounted to a front bumper of a vehicle in a spaced relationship in a widthwise direction thereof, and a controller for controlling operations of two actuators for lifting up a trailing end of a hood responsive to output signals from the bumper sensors. The controller converts accelerations, detected by the respective bumper sensors, into deformation speeds, with the deformation speeds, associated with the sensors which are adjacent to one another, being added. When an added deformation speed exceeds a predetermined threshold level, the controller controls the actuators to be initiated.

4 Claims, 11 Drawing Sheets

SENSOR SYSTEM FOR VEHICLE

BACKGROUND OF THE INVENTION

1. Field of the Invention

This invention relates to a sensor system which allows a trailing end of a hood of a vehicle to be lifted up a given height or a hood air bag, mounted in the vicinity of the hood, to be deployed, for absorbing an impact or shock from a secondary collision of an object on the hood during a frontal collision of the vehicle with the object.

2. Description of the Related Art

It has heretofore been proposed to provide a hood air bag sensor system for alleviating an impact shock to be applied to an object when a vehicle collides with the object and the object is jumped over a hood of the vehicle to encounter a secondary collision, as disclosed in, for example, a Japanese Patent Kokai (Laid-open) Publication NO. HEI-8-216826.

With such a sensor system, an impact load, which undergoes in a horizontal and frontal direction the collision of the vehicle against the object, is detected by a single bumper sensor which is mounted to a substantially central area of a front bumper in a widthwise direction of the vehicle. Upon receipt of output signals produced by the hood air bag sensor system involving such a bumper sensor, a control device functions to actuate a hood air bag.

However, the aforementioned hood air bag system encounters difficulty in accurately detecting the impact load to be applied to the object especially when the object collides with the front bumper a position displaced from the bumper sensor. In order to address this issue, for example, if a large number of load sensors or displacement sensors are mounted to the front bumpers, even though the load or displacement values are enabled to be accurately detected, other problems are encountered such as an increase in production cost or a decrease in productivity.

SUMMARY OF THE INVENTION

It is therefore an object of the present invention to provide a vehicular sensor system which can discriminate an object with increased accuracy with a reduced number of sensors.

According to an aspect of the present invention, there is provided a vehicular sensor system which is responsive to a collision of an object against a front bumper of a vehicle to allow either one of a lift-up operation of a rear trailing end of a hood of the vehicle and a deployment operation of a hood air bag, which is mounted in the vicinity of the hood, to be initiated, which comprises a plurality of bumper sensors mounted to the front bumper at positions spaced from one another in a widthwise direction of the vehicle, and a controller which converts signals, detected by the respective bumper sensors, into deformation speeds, with the deformation speeds, associated with the bumper sensors which are adjacent to one another, being added for controlling the either one of the lift-up operation of the trailing end of the hood and the deployment operation of the hood air bag to be initiated when the added result exceeds a predetermined threshold level.

With this arrangement, even when the object encounters the collision between the adjacent bumper sensors, addition of two deformation speeds is reflected with an increased deformation speed result to obtain the increased deformation speed even when the impact position of the object is displaced from the respective bumper sensors, thereby preventing an impact discriminating performance for the object from being deteriorated.

It is desirable that the controller includes a first deformation speed detector for converting a signal, which is detected by a first bumper sensor mounted at one side of the front bumper in the widthwise direction, into a first deformation speed, a second deformation speed detector for converting a signal, which is detected by a second bumper sensor mounted at a substantially central area of said front bumper, into a second deformation speed signal, a third deformation speed detector for converting the signal, which is detected by a third bumper sensor mounted at the other side of said front bumper in the widthwise direction, into a third deformation speed, a first adder for adding the first and second deformation speeds detected by the first and second deformation speed detectors, respectively, a second adder for adding the second and third deformation speeds detected by the second and third deformation speed detectors, respectively, a first comparator for comparing the first added deformation speed, which is added by the first adder, with a predetermined threshold level, a second comparator for comparing a second added deformation speed, which is added by the second adder, with the predetermined threshold level, and an actuation discriminator for initiating the either one of the lift-up operation of the trailing end of the hood and the deployment operation of the hood air bag when either one of the added deformation speeds compared with the first and second comparators exceeds the predetermined threshold level.

In this arrangement, since the detected deformation speeds are added by the first and second adders and the respective deformation speeds are compared with the first and second comparators, respectively, with the actuation discriminator serving to discriminate on the basis of the compared deformation speeds, for example, even when the object encounters the collision between the first and second bumper sensors, the impact of the object is enabled to be accurately discriminated, enabling the improvement over the discriminating accuracy for the impact of the object even with fewer bumper sensors.

Preferably, the controller controls to initiate the either one of the lift-up operation of the trailing end of the hood and the deployment operation of the hood air bag when the signals, which are detected while the respective bumper sensors, are converted into the deformation speeds with the deformation speeds, associated with the bumper sensors which are adjacent to one another, being added and the added result exceeds the first predetermined threshold level, and when the respective deformation speeds are converted into respective deformation quantities while the two deformation quantities are added and the added result exceeds the second predetermined threshold level.

In a preferred form, the controller further includes a first deformation speed detector for converting the signal, which is detected by a first bumper sensor mounted at one side of the front bumper in the widthwise direction, into a first deformation speed, a second deformation speed detector for converting the signal, which is detected by a second bumper sensor mounted at the other side of the front bumper, into a second deformation speed signal, a first adder for adding the first and second deformation speeds detected by the first and second deformation speed detectors, respectively, a first comparator for comparing first added deformation speed, which is added by the first adder, with a first predetermined threshold level, a first deformation quantity detector for converting a first deformation speed, which is converted by the first deformation speed detector, into a first deformation quantity, a second deformation quantity detector for converting a second deformation speed, which is converted by the second deformation speed detector, into a second deformation quantity, a second adder for adding the first and second deformation quantities converted by the first and second deformation quantity detectors, respectively, second comparator for comparing an added deformation quantity, which is added by the second adder, with a second predetermined threshold level, and an actuation discriminator for initiating either one of the lift-up operation of the trailing end of the hood and the deployment operation of the hood air bag when the added deformation speed, which is compared with the first comparator, exceeds the first threshold level and when the added deformation quantity, which is compared with the second comparator, exceeds the second threshold level.

In this arrangement, when the object encounters the collision between the first and second bumper sensors, the actuation discriminator executes required discrimination on the basis of the deformation speed compared by the first comparator and the deformation quantity compared by the second comparator. As a result, it becomes possible to accurately discriminate an object collision with a reduced number of sensors.

BRIEF DESCRIPTION OF THE DRAWINGS

The invention, together with objects and advantages thereof, may best be understood by reference to the following description of the presently preferred embodiments together with the accompanying drawings, in which:

FIG. 6A is a schematic view illustrating an object colliding with a front bumper closely to one of an adjacent pair of the bumper sensors, while

FIG. 7A is a schematic view illustrating an object colliding with the front bumper at its nearly central part between adjacent two bumper sensors, while

DETAILED DESCRIPTION OF THE PREFERRED EMBODIMENT

The following description is merely exemplary in nature and is in no way intended to limit the invention, its application or uses.

Figure 1:
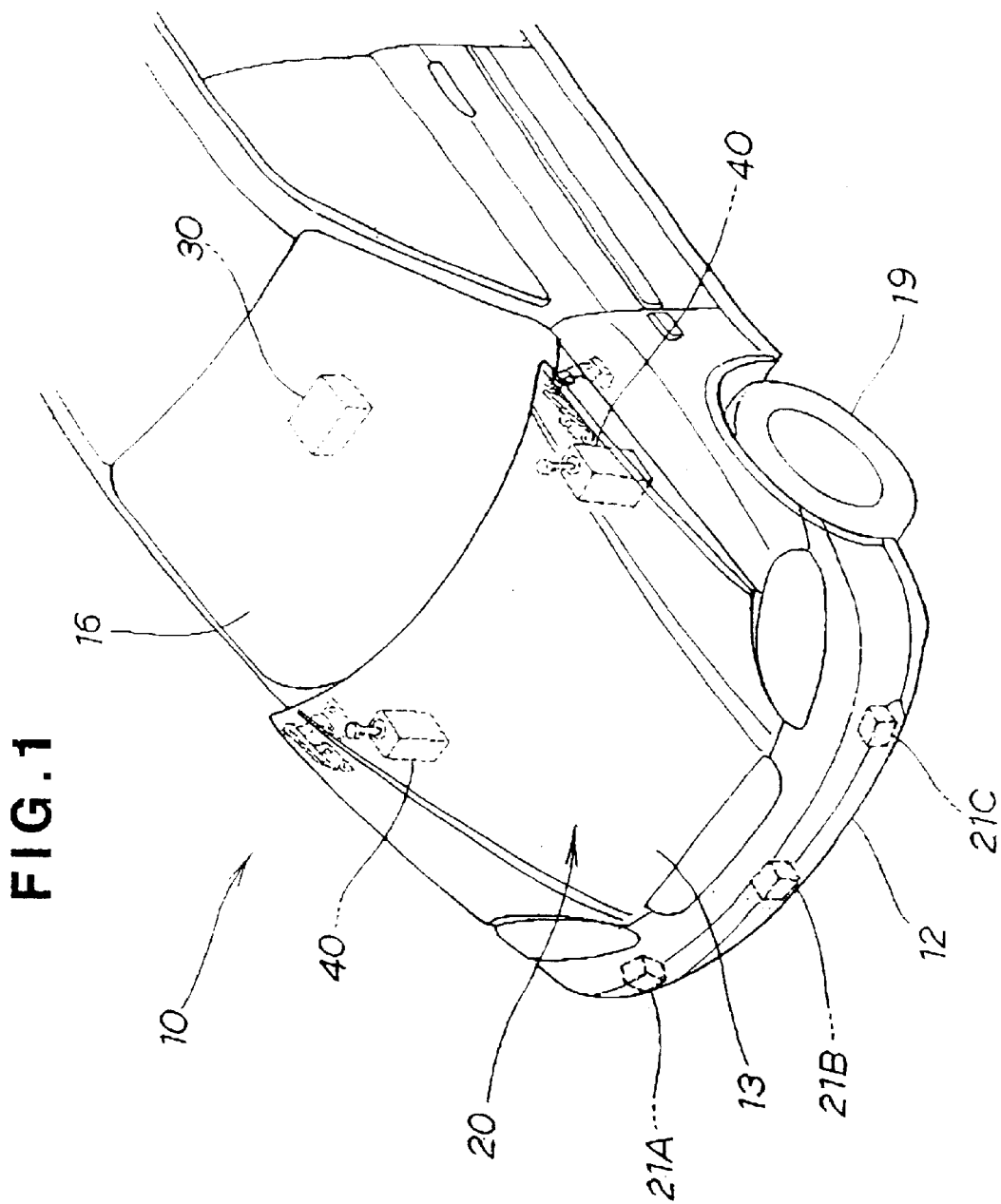
FIG. 1 is a perspective view of a vehicle which is equipped with a sensor system, for a vehicular hood, according to a preferred embodiment of the present invention.

Referring to FIG. 1, there is shown a vehicle 10 which has a front bumper 12, a vehicular hood 13, a front glass 16, a front wheel pair 19, a vehicular sensor system 20, a first bumper sensor 21A mounted at one side of the front bumper 12 in a widthwise direction thereof, a second bumper sensor 21B mounted at a substantially central area of the front bumper 12 in the widthwise direction thereof, a third bumper sensor 21C mounted at the other side of the front bumper 12 in the widthwise direction thereof, a controller 30 and actuators 40, 40.

Figure 2:
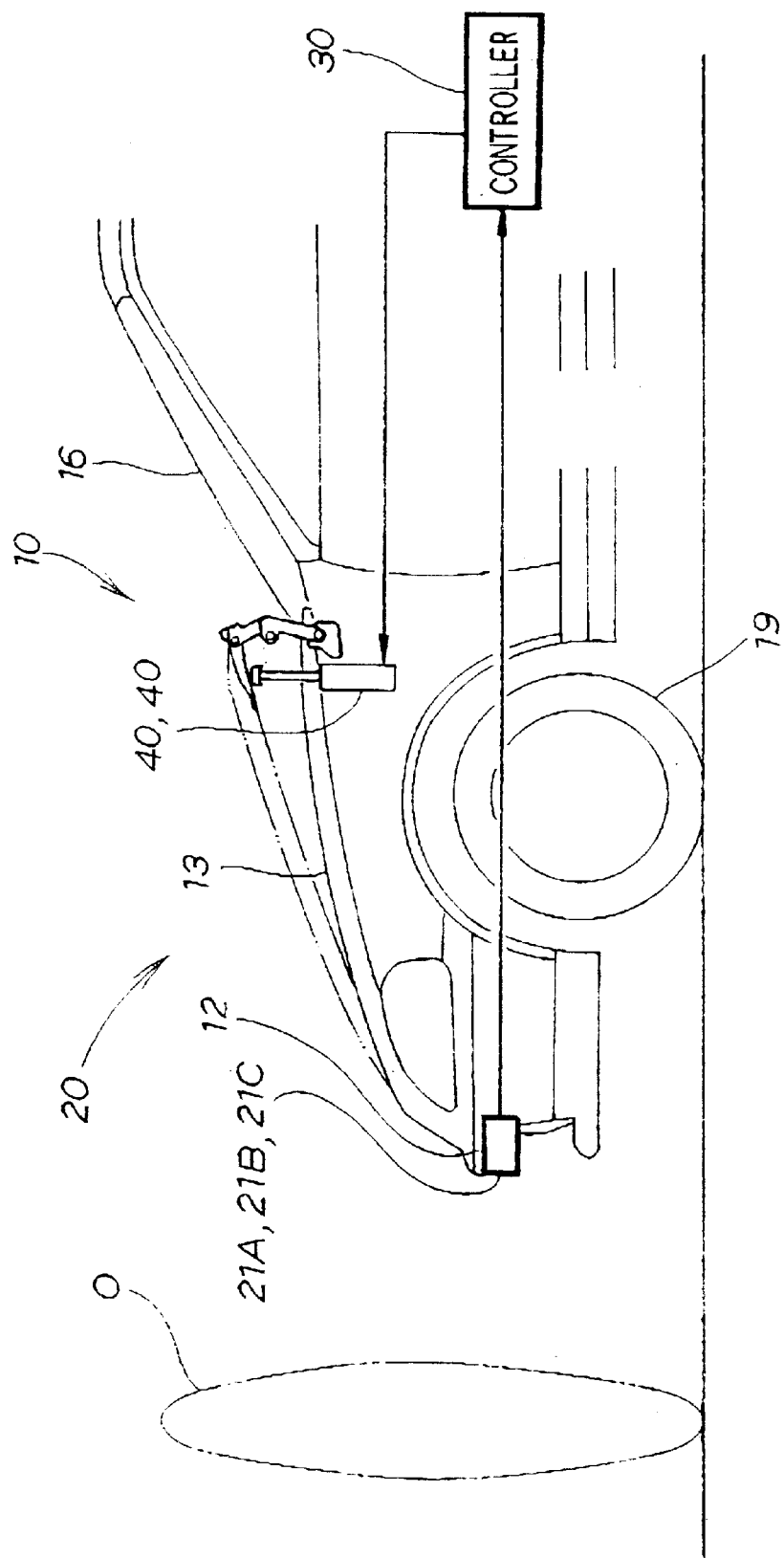
FIG. 2 is a side view of the vehicle shown in FIG. 1, illustrating a relationship among bumper sensors, controller and actuators.

In FIG. 2, the vehicular sensor system 20 is constructed of the first to third bumper sensors 21A to 21C mounted to the front bumper 12, the controller 30 which is applied with information from the sensors 21A to 21C, and the actuators 40, 40 which are responsive to command signals from the controller 30 to actuate and lift up a trailing end of the hood 13 by a given height. Collision between an object O and the front bumper 12 is detected by the first to third sensors 21A to 21C, with a resultant lift up of the hood 13 for alleviating a secondary impact due to collision of the object O against the hood 13. The first to third sensors 21A to 21C may, for example, include acceleration sensors, respectively, for detecting the degrees of acceleration as signals.

Figure 3:
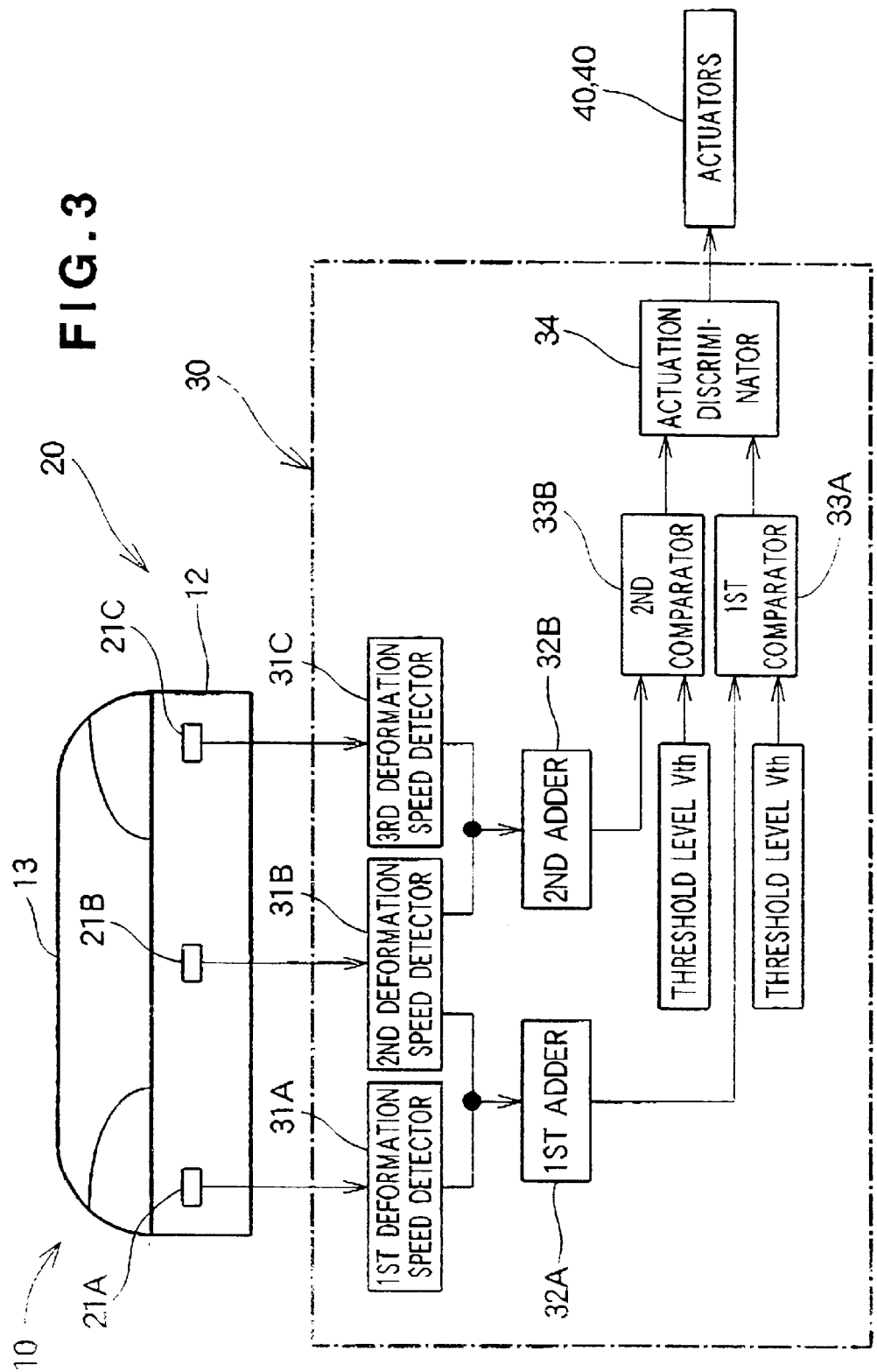
FIG. 3 is a block diagram of an electric circuitry of the controller shown in FIG. 2.

The controller 30 shown in FIG. 3 converts acceleration signals, delivered from the plural bumper sensors 21A to 21C, into respective deformation speeds, with the deformation speeds, related to the aforementioned bumper sensors 21A to 21C which are adjacent to one another, being added to control the actuators to cause the trailing end of the hood 13 to be lifted up when the added result exceeds a predetermined threshold level.

The controller 30 includes first to third deformation speed detectors 31A to 31C for converting the degrees of acceleration, detected by the first to third bumper sensors 21A to 21C, into respective deformation speeds, a first adder 32A for adding the deformation speeds converted by the first and second deformation speed detectors 31A, 31B, a second adder 32B for adding the deformation speeds converted by the second and third deformation speed detectors 31B, 31C, a first comparator 33A for comparing a first added deformation speed, which is added by the first adder 32A, with a predetermined threshold level Vth, a second comparator 33B for comparing a second added deformation speed, which is added by the second adder 32B, with the predetermined threshold level Vth, and an actuation discriminator 34 for operating the actuators 40, 40 when either one of the added deformation speeds, which are compared with the first and second comparators 33A, 33B, exceeds the threshold value Vth.

Thus, since the aforementioned deformation speeds are added by the first and second adders 32A, 32B, the added first and second deformation speeds are compared with the first and second comparators 33A, 33B and the added deformation speeds, which are compared, are discriminated with the actuation discriminator 34, it is possible to discriminate the presence of the object O in a precise manner even in a case, for example, where the object O (see FIG. 2) collides with the front bumper 12 at a position between the first and second bumper sensors 21A, 21B, or where the object O collides with the front bumper 12 at another position between the second and third bumper sensors 21B, 21C. That is, even in an instance where there are small number of the bumper sensors 21A to 21C as shown, it is possible to improve a discriminating accuracy of the object O (see FIG. 2).

Figure 4:
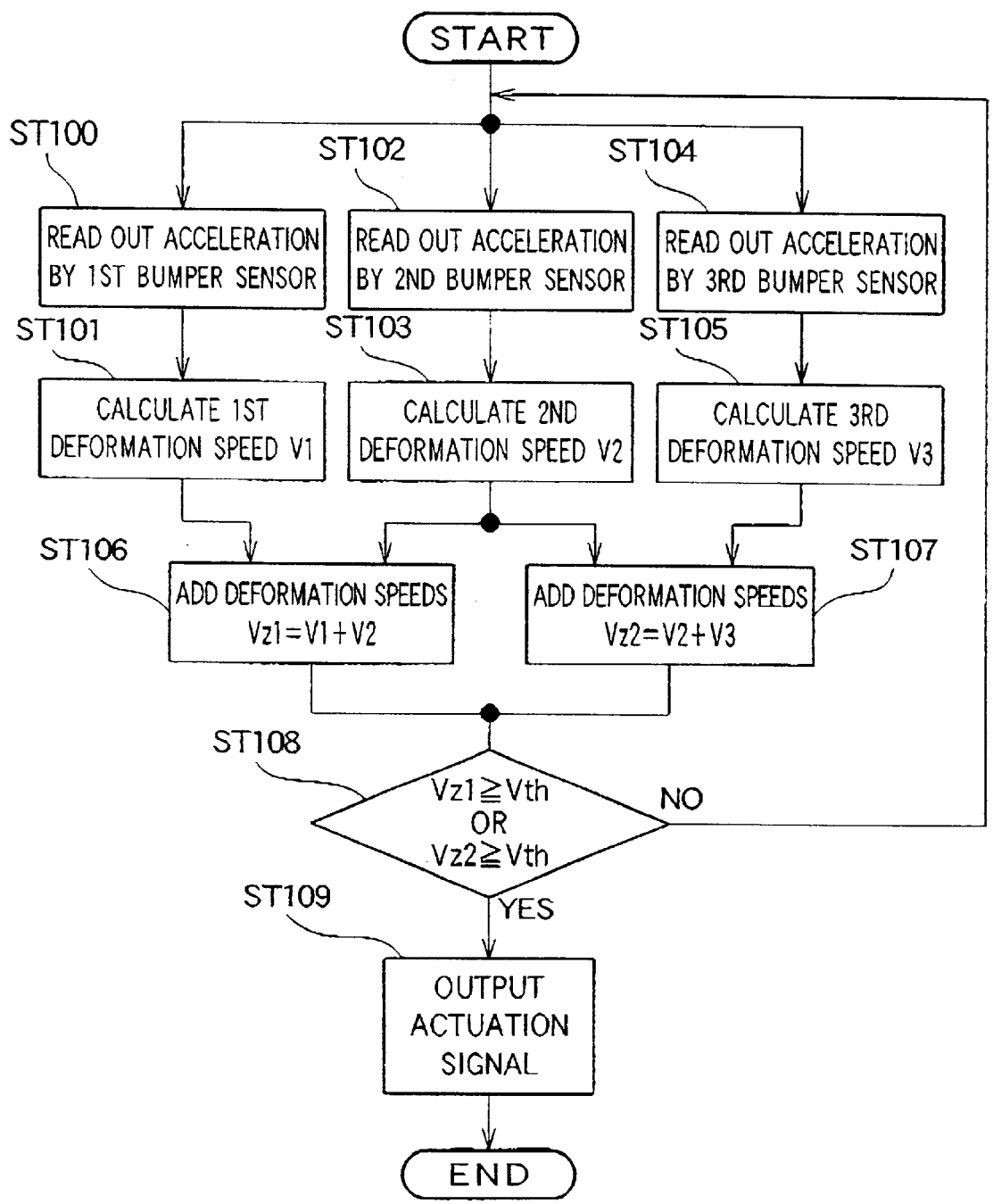
FIG. 4 is a flow diagram illustrating a basic sequence of operation of the controller shown in FIG. 3.

Now, the basic sequence of operation of the controller 30 of the preferred embodiment is described below in detail with reference to a flow diagram shown in FIG. 4.

Step (hereinafter abbreviated as ST) 100: The first bumper sensor 21A reads out the degree of acceleration of the front bumper 12.

ST 101: The first deformation speed detector 31A calculates the first deformation speed V1 from the degree of acceleration.

ST 102: The second bumper sensor 21B reads out the degree of acceleration of the front bumper 12.

ST 103: The second deformation speed detector 31B calculates the second deformation speed V2 from the degree of acceleration.

ST 104; The third bumper sensor 21C reads out the degree of acceleration of the front bumper 12.

ST 105: The third deformation speed detector 31C calculates the third deformation speed V3 from the degree of acceleration.

ST 106: The first adder 32A adds the first and second deformation speeds V1, V2, thereby obtaining a first added deformation speed Vz1.

ST 107: The second adder 32B adds the second and third deformation speeds V2, V3, thereby obtaining a second added deformation speed Vz2.

ST 108: The actuation discriminator 34 discriminates whether the first added deformation speed VZ1 exceeds a predetermined threshold value Vth, or whether the second added deformation speed Vz2 exceeds the aforementioned threshold value Vth, (Vz1≧Vth, or Vz2≦Vth). In case of "YES", the operation goes to step ST 109, and in case of "NO", the operation returns to the initial step.

ST 109: The actuation discriminator 34 produces an actuation signal, thereby operating the actuators 40, 40.

Figure 5:
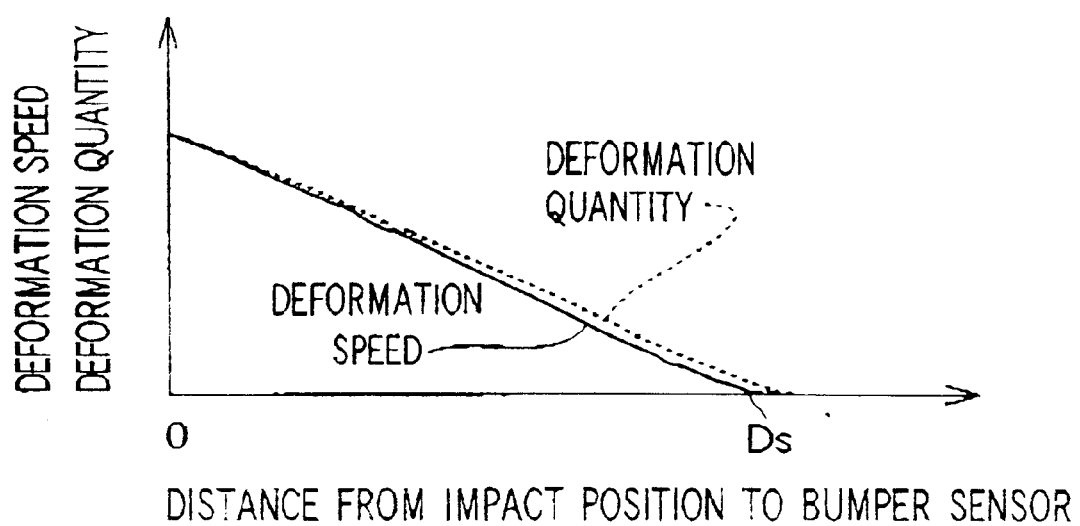
FIG. 5 is a graph illustrating a relationship of a deformation speed or a deformation quantity in terms of a distance between an impact position and a bumper when an object encounters a collision at an area between two separated bumper sensors.

FIG. 5 is a graph for illustrating the limit of distance for which the deformation speeds or the deformation quantities can be detected in a case where impact positions of the object are displaced from the bumper sensors. The axis of abscissas designates the distance between the impact position and the bumper sensor, and the axis of ordinates designates the deformation speed or the deformation quantity.

The deformation speed decreases in a substantially linear manner as the impact position is displaced from the bumper sensors by a greater distance. Likewise, the deformation quantity decreases in a substantially linear manner as the impact position is displaced from the bumper sensors by a greater distance. Now, assuming that a critical distance for which the deformation speeds or the deformation quantity can be detected is represented as Ds, in general, the critical distance Ds varies in a value ranging from about 500 to 700 mm.

Figure 6A:
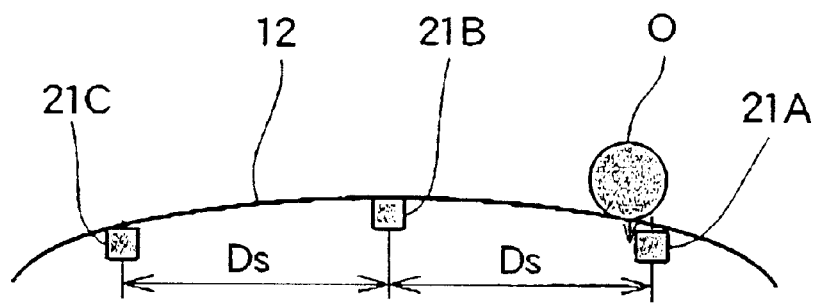
Figure 6B:
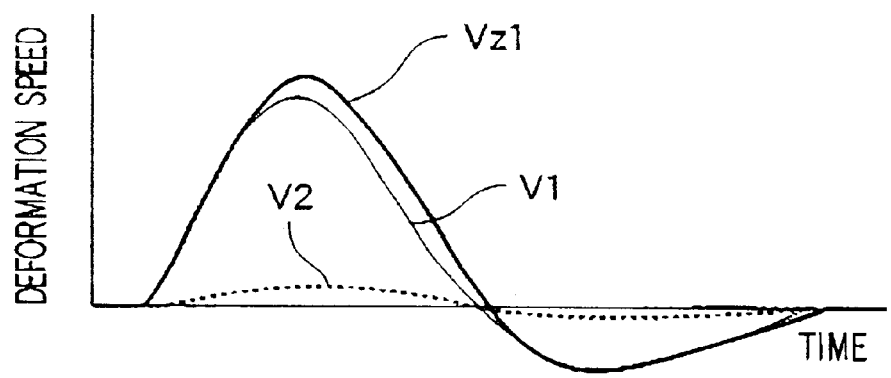
FIG. 6B is a graph illustrating a relationship of the deformation speed in terms of the time interval during such a condition.

FIG. 6A is a schematic view for illustrating an impact condition of the object O which is brought into collision with the front bumper 12 at a location between the first and second bumper sensors 21A, 21B in the vicinity of the first bumper sensor 21A, and FIG. 6B is a graph illustrating the relationship between the deformation speed and the time during the aforementioned collision.

In FIG. 6B, the first deformation speed V1 is a deformation speed which is calculated from the degree of acceleration detected by the first bumper sensor 21A and the detected deformation speed remains at a low value because the colliding position of the object O is displaced from the second bumper sensor 21B.

Figure 7A:
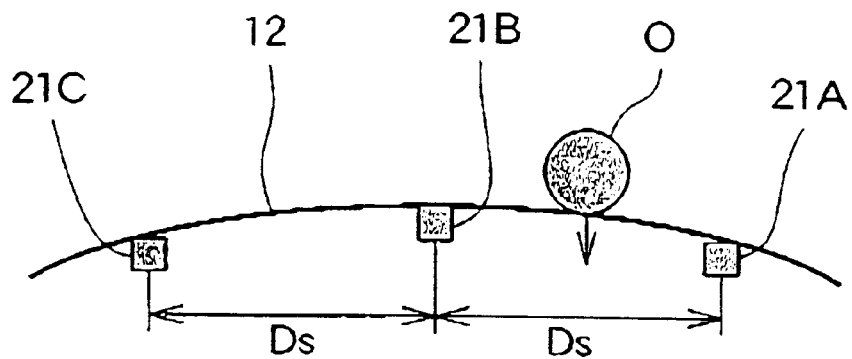
Figure 7B:
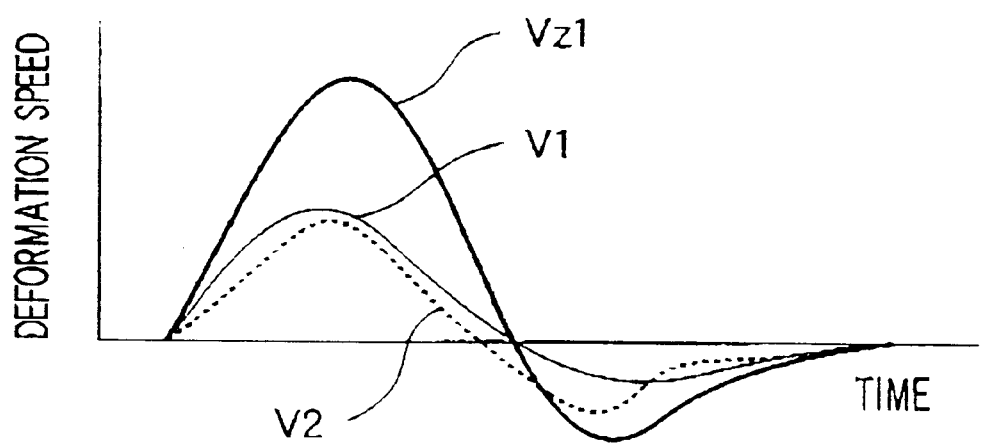
FIG. 7B is a graph illustrating the relationship of the deformation speed in terms of the time interval during such a condition.

FIG. 7A is a schematic view for illustrating an impact condition of the object O which is brought into collision with the front bumper 12 at a location between the first and second bumper sensors 21A, 21B, and FIG. 7B is a graph illustrating the relationship between the deformation speed and the time during the aforementioned collision.

In FIG. 7B, the first deformation speed V1 is a deformation speed which is calculated from the degree of acceleration detected by the first bumper sensor 21A, and the second deformation speed V2 is a deformation speed which is calculated from the degree of acceleration detected by the second bumper sensor 21B. When the object O is brought into collision with the front bumper at a position between the first and second bumper sensors 21A and 21B, the deformation speed, which can be calculated, remains at an approximately intermediate value, with the first and second deformation speeds V1 and V2 remaining at substantially the same value.

However, adding the first and second deformation speeds V1 and V2 allows the deformation speed to have a large value appearing between the first and second bumper sensors 21A, 21B Here, comparison between the graphs of the FIGS. 6B and 7B reveals that the first and second acceleration deformation speeds Vz1 and Vz2 have a value substantially equal to one another, and adding the first deformation speed V1 and the second deformation speed V2 allows the deformation speed to be treated as remaining at a substantially constant value regardless of the impact position of the object O provided that the impact position remains in a position between the first bumper sensor 21A and the second bumper sensor 21B. That is, since the first added deformation speed Vz1, which is added by the first deformation speed V1 and the second deformation speed V2, has a greater deformation speed than respective values of the first deformation speed V1 and the second deformation speed V2, even in a case where the impact position of the object O is displaced from the respective sensors V1, V2, the addition of the first and second deformation speeds V1, V2 allows an increased deformation speed to be obtained for thereby preventing degradation of the discriminating performance.

Figure 8:
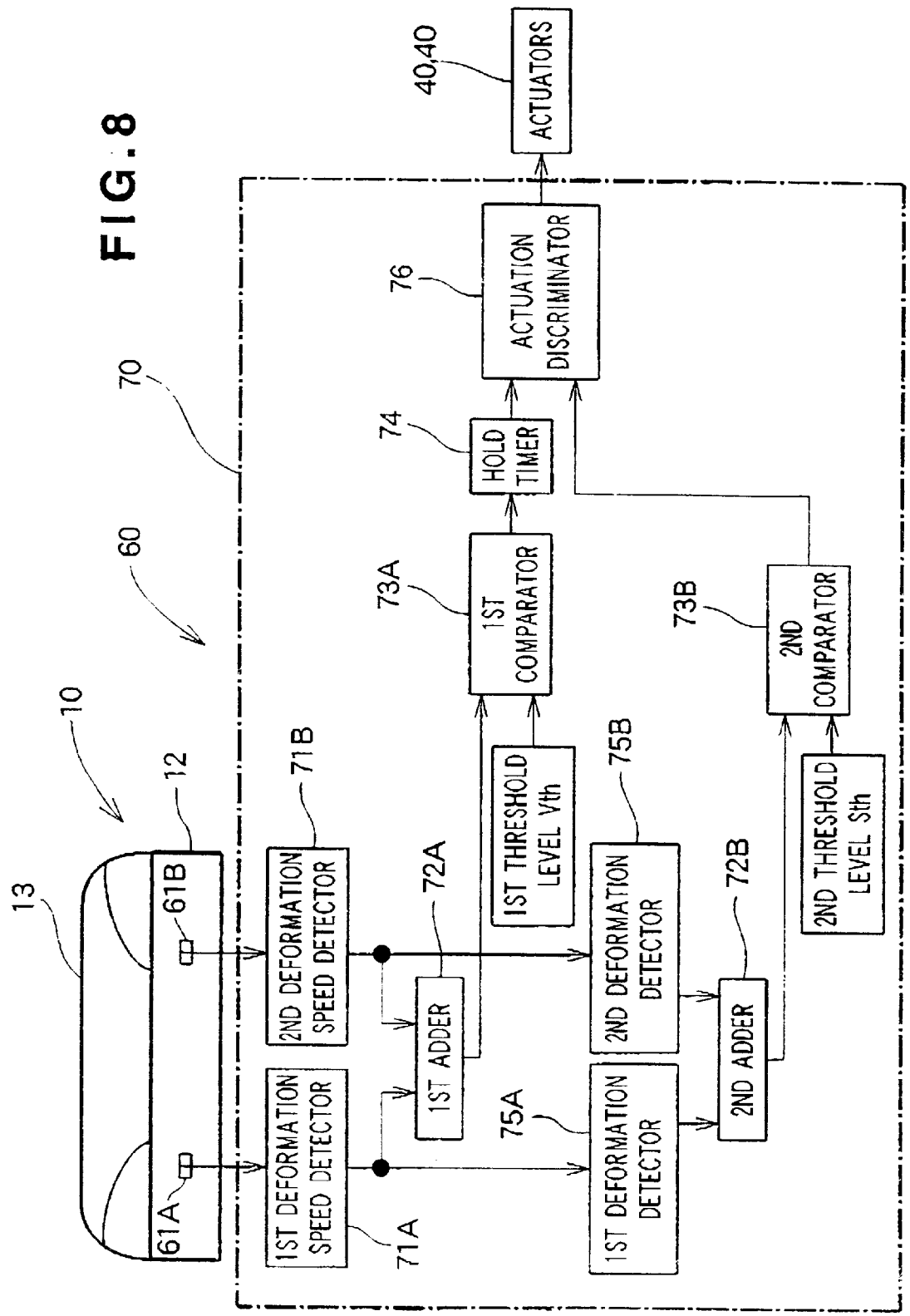
FIG. 8 is a block diagram of an electric circuitry of a controller of a vehicular sensor system of a second preferred embodiment according to the present invention.

FIG. 8 is a block diagram for an electric circuitry of a hood actuating device 60 which serves as a vehicular sensor system of a second preferred embodiment according to the present invention.

The hood actuating device 60 of the second preferred embodiment includes two bumper sensors 61A, 61B mounted to a front bumper 52 at both side areas thereof in a widthwise direction of a vehicle, and a controller 70 which controls the actuators 40, 40 for allowing the trailing end of the hood 13 to be jumped up on the basis of operations of the two bumper sensors 61A, 61B.

The controller 70 converts signals, which are produced by the first and second bumper sensors 61A, 61B, to respective converted deformation speeds, with the two deformation speeds being added to provide added results such that when the added results exceed a first predetermined threshold level, the aforementioned respective deformation speeds are convened into respective deformation quantities, and with the two deformation quantities being added to provide added results such tat when the added results exceed a second predetermined threshold level, the actuators are controlled to operate such as to lift up the trailing end of the hood 13.

The controller 70 is constructed of a first deformation speed detector 71A which converts the degree of acceleration, detected by the first bumper sensor 61A, into a deformation speed, a second deformation speed detector 71B which converts the degree of acceleration, detected by the second bumper sensor 61B, into a deformation speed, a first adder 72A which adds the deformation speeds, which are converted by the first and second deformation speed detectors 71A, 71B, to produce added deformation speed, a first comparator 73A which compares the added deformation speed with the first predetermined threshold level Vth2, a hold timer 74 which keeps the added deformation speed for a given time interval when the added-deformation speed, which is compared with the first comparator 73A, exceeds the threshold level Vth2, a first deformation quantity detector 75A which converts the deformation speed which is converted by the first deformation speed detector 71A, a second deformation quantity detector 75B which converts the deformation speed, which is converted by the second deformation speed detector 71B, a second adder 72B which adds the incremental deformation quantities, which are converted by the first and second deformation quantity detectors 75A, 75B, to produce added deformation quantity results, a second comparator 73B which compares the added deformation quantity results with the second predetermined threshold level Sth, and an actuation discriminator 76 which operates the actuators 40, 40 when the aforementioned added deformation speeds exceeds the first threshold level Vth and the aforementioned added deformation quantity results exceed the second threshold level Sth.

As in the first preferred embodiment, each of the first and second bumper sensors 61A, 61B may preferably comprise an acceleration sensor for detecting the degree of acceleration. The hold timer 74 serves to keep the deformation speed for the given time interval because the time instant, at which the deformation quantity result reaches the maximum value, is delayed from the time instant at which the deformation speed reaches the maximum value.

Thus, in the second preferred embodiment, when the object O (see FIG. 2) is brought into collision with the front bumper at an area between the first and second bumper sensors 61A, 61B, since the actuation discriminator 76 serves to discriminate on the basis of the added deformation speeds which is compared with the first comparator 73A, and the added deformation quantity result, which is compared with the second comparator 73B, it is possible for accurately discriminating the object O. That is, even with the small number of two bumper sensors 61A, 61B, it is possible to improve the discriminating accuracy of the object O.

Figure 9:
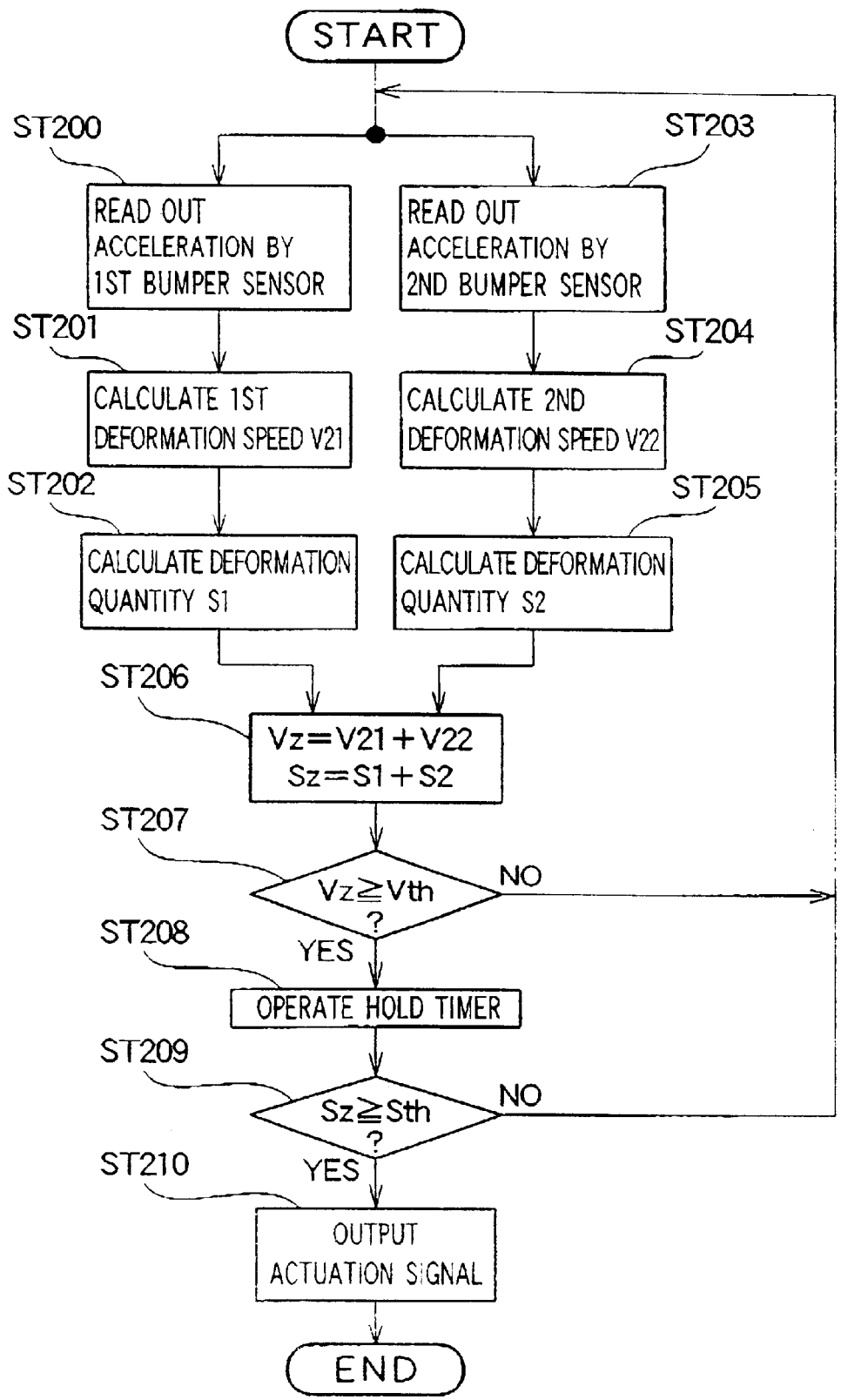
FIG. 9 is a flow diagram of the basic sequence of operation of the controller shown in FIG. 8.

Now, the basis sequence of operation of the controller 70 of the second preferred embodiment shown in FIG. 8 is described below in detail with reference to a flow diagram shown in FIG. 9.

ST 200: The first bumper sensor 61A reads out the degree of acceleration of the front bumper 12.

ST 201: The first deformation speed detector 71A calculates the first deformation speed V21 from the degree of acceleration.

ST 202: The first deformation quantity detector 75A calculates the first deformation quantity result S1 from the first deformation speed V21.

ST 203: The second bumper sensor 61B reads out the degree of acceleration of the front bumper 12.

ST 204: The second deformation speed detector 71B calculates the second deformation speed V22 from the degree of acceleration.

ST 205: The second deformation quantity detector 75B calculates the second deformation quantity result S2 from the second deformation speed V22.

ST 206: The first adder 72A adds the first and second deformation speeds V21, V22, thereby calculating the added deformation speed Vz. The second adder 72B adds the first deformation quantity result S1 and the second deformation quantity result S2, thereby calculating the added deformation quantity result Sz.

ST 207: The first comparator 73A discriminates whether the added deformation speed Vz exceeds or is below the first threshold level Vth. In case of "YES", the operation goes to ST 208, and in case of "NO", the operation returns to the initial step.

ST 208: When the added deformation speed Vz exceeds the first threshold level Vth, the controller operates the hold timer 74 to allow the same to keep the added deformation speed Vz for the given time interval.

ST 209: The second comparator 73B discriminates whether the added deformation quantity result exceeds or is below the threshold level Sth. In case of "YES", the operation goes to ST 210, and in case of "NO", the operation returns to the original step.

ST 210: The actuation discriminator 76 produces an actuation signal output, by which the actuators 40, 40 are operated.

Figure 10A:
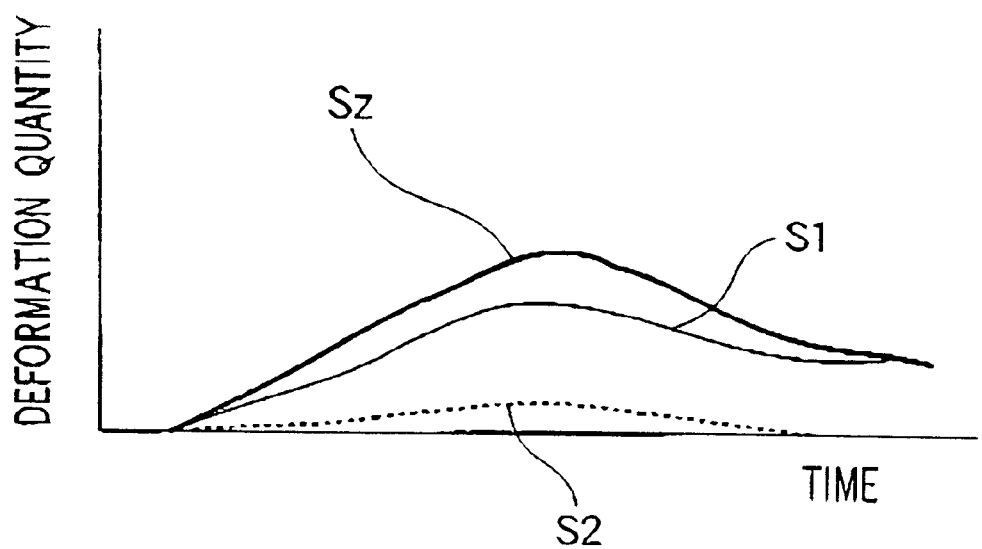
FIGS. 10A and 10B are graphs illustrating the relationships of the deformation quantities in tent of the time interval with respect to a case when the object encounters the collision against the front bumper in the vicinity of one of the bumper sensors and a case when the object encounters the collision at a substantially central area of the front bumper.
Figure 10B:
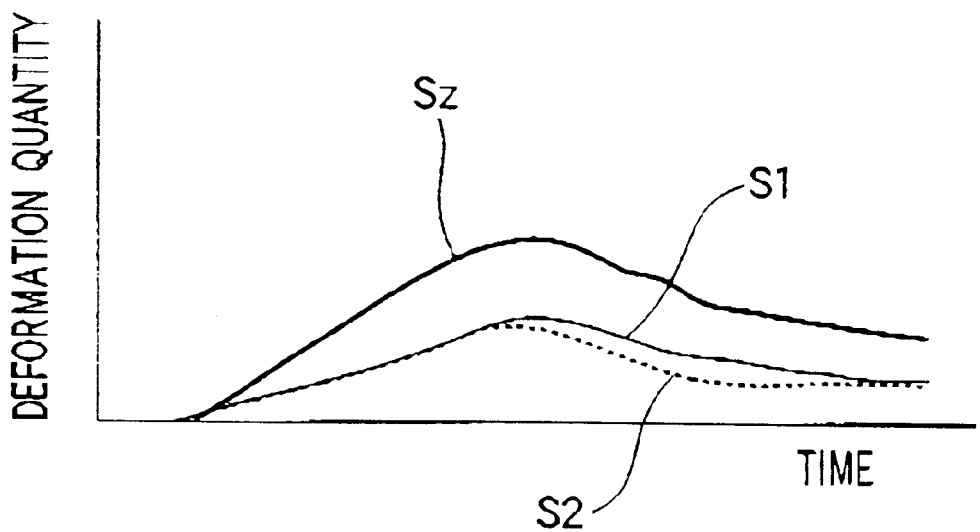

FIGS. 10A and 10B are graphs illustrating the deformation quantity result of the front bumper in terms of the time interval during collision of the object O (see FIG. 2). As previously discussed above with reference to FIG. 5, the distance between the impact position of the object O (see FIG. 2) and the bumper sensors 61A, 61B (see FIG. 8) increases, the deformation quantity linearly decreases.

FIG. 10A is a graph illustrating variation of the deformation quantity in terms of the time interval in a case where the object O is brought into collision with the front bumper at the area between the first and second bumper sensors 61A, 61B in the vicinity of the first bumper sensor 61A. According to this graph, it is appreciated that the detected result detected by the first bumper sensor 61A remains at a high value and the detected result detected by the second bumper sensor 61B remains at a small value.

FIG. 10B is a graph illustrating variation of the deformation quantity in terms of the time interval in a case where the object O is brought into collision with the front bumper at a substantially central area between the first and second bumper sensors 61A, 61B. According to this graph, it is appreciated that the detected results detected by the first and second bumper sensors 61A, 61B remain at a substantially medium level.

Comparison between FIGS. 10A and 10B reveal that the added deformation quantity results Sz have substantially the same incremented value, and addition of the first deformation quantity S1 and the second deformation S2 allows the added deformation quantity result to have a substantially constant level regardless of the impact position of the object provided that the impact position remains between the first and second bumper sensors 61A, 61B, thereby enabling an improvement in the discriminating performance of the object O.

Although the first preferred embodiment has been shown as including three sensors composed of the first to third bumper sensors 21A to 21C as viewed in FIG. 3, the present invention is not limited thereto and may be modified so as to include two sensors or to include more than four sensors with decreased or increased number of adders and comparators, if desired.

Although the second preferred embodiment has been described as employing two sensors composed of the first and second bumper sensors 61A, 61B as viewed in FIG. 8, the present invention is not limited thereto and the number of the sensors may be increased.

Although the first and second preferred embodiments as seen in FIGS. 3 and 8 have been shown as including the first to third bumper sensors 21A to 21C and the first and second bumper sensors 61A, 61B composed of the acceleration sensors which detect the degrees of acceleration, the present invention is not limited thereto and a modification may be made so as to suitably combine a sensor which enables direct detection of the deformation speed and a sensor which enables detection of the deformation quantity.

Figure 11:
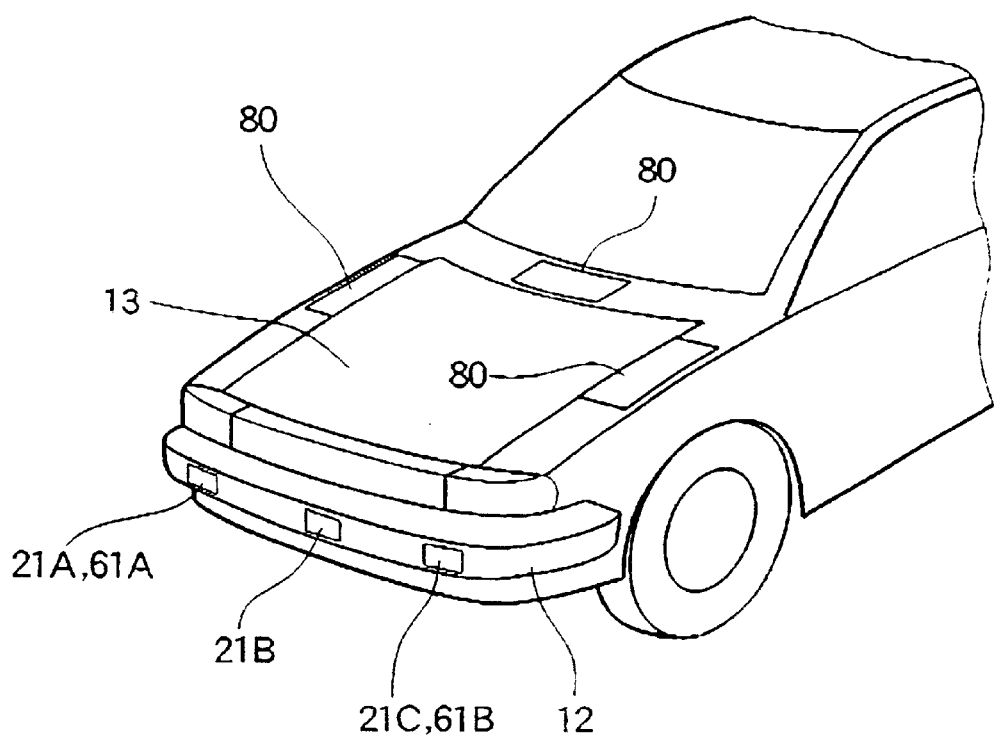
FIG. 11 is a perspective view of a vehicle for illustrating a case where an air bag is mounted in the vicinity of a hood for alleviating an impact force caused due to a secondary collision of the object against the hood.

As shown in FIGS. 3 and 8, the first and second preferred embodiments have been described as the vehicular sensor system applied to the vehicular hood assembly, the present invention is not limited thereto and the vehicular sensor system may form an impact absorbing device to allow an airbag for protecting an object, such as for example a hood air bag 80 shown in FIG. 11, to be actuated.

Obviously, various minor changes and modifications of the present invention are possible in the light of the above teaching. It is therefore to be understood that within the scope of the appended claims, the invention may be practiced otherwise than as specifically described.

What is claimed is:

1. A vehicular sensor system which is responsive to a collision of an object against a front bumper of a vehicle to allow either one of a lift-up operation of a rear trailing end of a hood of the vehicle and a deployment operation of a hood air bag, which is mounted in the vicinity of the hood, to be initiated, said sensor system comprising:

a plurality of bumper sensors mounted to said front bumper at positions spaced from one another in a widthwise direction of the vehicle; and a controller which converts signals, detected by said respective bumper sensors, into deformation speeds, with said deformation speeds, associated with the bumper sensors which are adjacent to one another, being added for controlling the either one of said lift-up operation of said trailing end of said hood and the deployment of said hood air bag to be initiated when the added result exceeds a predetermined threshold level.

2. The sensor system according to claim 1, wherein said controller includes:

a first deformation speed detector for converting a signal, which is detected by a first bumper sensor mounted at one side of said front bumper in said widthwise direction, into a first deformation speed;

a second deformation speed detector for converting a signal, which is detected by a second bumper sensor mounted at a substantially central area of said front bumper, into a second deformation speed signal;

a third deformation speed detector for converting the signal, which is detected by a third bumper sensor mounted at the other side of said front bumper in said widthwise direction, into a third deformation speed;

a first adder for adding said first and second deformation speeds detected by said first and second deformation speed detectors, respectively;

a second adder for adding said second and third deformation speeds detected by said second and third deformation speed detectors, respectively;

a first comparator for comparing said first added deformation speed, which is added by said first adder, with a predetermined threshold level;

a second comparator for comparing a second added deformation speed, which is added by said second adder, with the predetermined threshold level; and an actuation discriminator for initiating the either one of the lift-up operation of the trailing end of said hood and the deployment of said hood air bag when either one of the added deformation speeds of said first and second comparators exceeds the predetermined threshold level.

3. The sensor system according to claim 1, wherein said controller controls to initiate the either one of the lift-up operation of said trailing end of said hood and the deployment operation of said hood air bag when the signals, which are detected by said respective bumper sensors, are converted into the deformation speeds while said deformation speeds, associated with the bumper sensors which are adjacent to one another, are added and the added result exceeds the first predetermined threshold level, and when said respective deformation speeds are converted into respective deformation quantities while the two deformation quantities are added and the added result exceeds the second predetermined threshold level.

4. The sensor system according to claim 3, wherein said controller includes:

a first deformation speed detector for converting the signal, which is detected by a first bumper sensor mounted at one side of said front bumper in said widthwise direction, into a first deformation speed;

a second deformation speed detector for converting the signal, which is detected by a second bumper sensor mounted at the other side of said front bumper, into a second deformation speed signal;

a first adder for adding said first and second deformation speeds detected by said first and second deformation speed detectors, respectively;

a first comparator for comparing first added deformation speed, which is added by said first adder, with a first predetermined threshold level;

a first deformation quantity detector for converting a first deformation speed, which is converted by said first deformation speed detector, into a first deformation quantity;

a second deformation quantity detector for converting a second deformation speed, which is converted by said second deformation speed detector, into a second deformation quantity;

a second adder for adding said first and second deformation quantities converted by said first and second deformation quantity detectors, respectively;

a second comparator for comparing an added deformation quantity, which is added by said second adder, with a second predetermined threshold level; and an actuation discriminator for initiating the either one of the lift-up operation of the trailing end of said hood and the deployment operation of said hood airbag when the added deformation speed, which is compared with said first comparator, exceeds the first threshold level and when the added deformation quantity, which is compared with said second comparator, exceeds the second threshold level.

* * * * *